United States Patent
Kim et al.

(10) Patent No.: US 8,720,932 B2
(45) Date of Patent: May 13, 2014

(54) HITCH RECEIVER APPARATUS FOR VEHICLE

(75) Inventors: Nam Cheol Kim, Suwon-si (KR); Seung Mok Lee, Gunpo-si (KR); Dong Eun Cha, Seongnam-si (KR); Hoo Taek Cho, Yongin-si (KR); Kyoon Soo Lim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 13/528,521

(22) Filed: Jun. 20, 2012

(65) Prior Publication Data

US 2013/0134690 A1 May 30, 2013

(30) Foreign Application Priority Data

Nov. 29, 2011 (KR) ........................ 10-2011-0125679

(51) Int. Cl.
*B60D 1/00* (2006.01)

(52) U.S. Cl.
USPC ..................................... 280/491.1; 280/491.2

(58) Field of Classification Search
USPC .......................................... 280/491.1, 491.2
See application file for complete search history.

(56) References Cited

U.S. PATENT DOCUMENTS

| | | | | | |
|---|---|---|---|---|---|
| 2,544,185 | A | * | 3/1951 | Sargent | 280/491.2 |
| 2,737,399 | A | * | 3/1956 | Halverson | 280/491.2 |
| 2,823,930 | A | * | 2/1958 | Cooper | 280/491.3 |
| 2,838,327 | A | * | 6/1958 | Collins | 280/491.2 |
| 2,889,155 | A | * | 6/1959 | Sandage | 280/491.3 |
| 2,978,260 | A | * | 4/1961 | Hebeisen | 280/495 |
| 4,032,170 | A | * | 6/1977 | Wood | 280/495 |
| 4,078,827 | A | * | 3/1978 | Pilhall | 280/491.3 |
| 5,277,448 | A | * | 1/1994 | Colibert | 280/495 |
| 5,358,269 | A | * | 10/1994 | Jakeman et al. | 280/490.1 |
| 5,489,111 | A | * | 2/1996 | Collins | 280/495 |
| 6,139,042 | A | * | 10/2000 | Tetrick | 280/497 |
| 6,149,181 | A | * | 11/2000 | Biederman | 280/491.1 |
| 6,189,910 | B1 | * | 2/2001 | Bartel | 280/491.2 |
| 6,502,845 | B1 | * | 1/2003 | Van Vleet | 280/491.1 |
| 6,511,090 | B2 | * | 1/2003 | Quanbeck et al. | 280/491.1 |
| 6,581,955 | B2 | * | 6/2003 | Aquinto et al. | 280/500 |
| 6,969,084 | B2 | * | 11/2005 | Kaepp et al. | 280/500 |
| 6,974,146 | B2 | * | 12/2005 | Abair | 280/470 |
| 6,974,148 | B2 | * | 12/2005 | Moss et al. | 280/511 |
| 7,156,411 | B2 | * | 1/2007 | Jaekel et al. | 280/495 |
| 7,451,996 | B2 | * | 11/2008 | Miles et al. | 280/490.1 |
| 8,091,913 | B1 | * | 1/2012 | White | 280/468 |
| 8,328,224 | B1 | * | 12/2012 | Alsaid | 280/511 |
| 2005/0167946 | A1 | * | 8/2005 | Rampp | 280/491.1 |

* cited by examiner

*Primary Examiner* — Kevin Hurley
*Assistant Examiner* — Michael Stabley
(74) *Attorney, Agent, or Firm* — Morgan, Lewis & Bockius LLP

(57) ABSTRACT

A hitch receiver apparatus for a vehicle is provided in which a hitch receiver is disposed without being directly connected with a rear back beam, such that the hitch receiver is kept in the rear back beam when not being used, and the hitch receiver protrudes down under the rear back beam when using the function of a trailer.

8 Claims, 6 Drawing Sheets

HITCH RECEIVER APPARATUS FOR VEHICLE

CROSS-REFERENCE TO RELATED APPLICATION

The present application claims priority of Korean Patent Application Number 10-2011-0125679 filed Nov. 29, 2011, the entire contents of which application is incorporated herein for all purposes by this reference.

BACKGROUND OF INVENTION

1. Field of Invention

The present invention relates to a hitch receiver apparatus. More particularly, it relates to a hitch receiver apparatus for a vehicle that is disposed not to be connected with a rear back beam.

2. Description of Related Art

Figure 1:
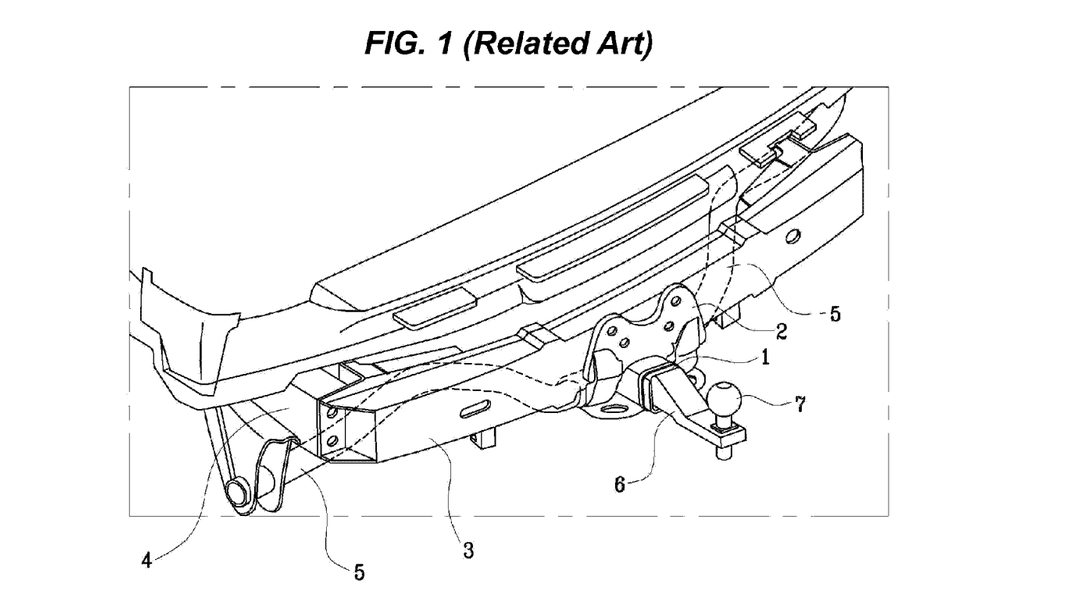
FIGS. 1 and 2 are views illustrating a hitch receiver apparatus of the related art.
Figure 2:
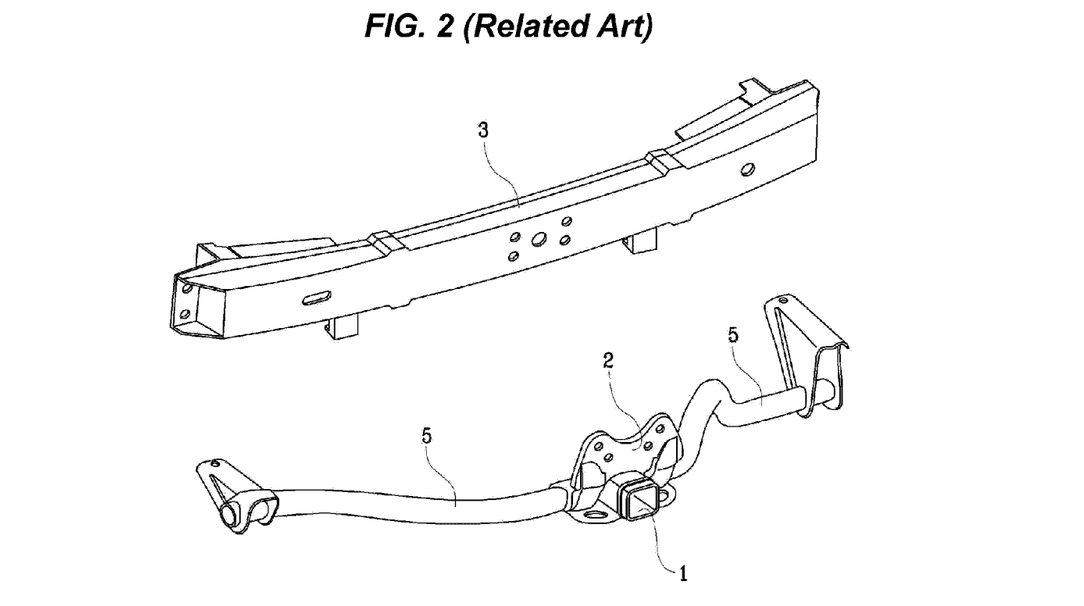

In general, a hitch receiver apparatus performing the function of a trailer, as shown in FIGS. 1 and 2, has a structure in which a hitch receiver 2 and a receiver bracket 2 are integrally combined and the receiver bracket 2 is coupled to the center of a rear back beam 3, and if necessary, a plurality of reinforcing beams 5 connecting the receiver bracket 2 with the a side member 4 is additionally disposed.

Further, when the function of a trailer is needed, a drawbar 6 is inserted and fixed in the hitch receiver 1 and a ball joint is fastened to the drawbar 6 for use, and after the use, the drawbar 6 and the ball joint 7 are separated from the hitch receiver 1 and kept.

Figure 3:
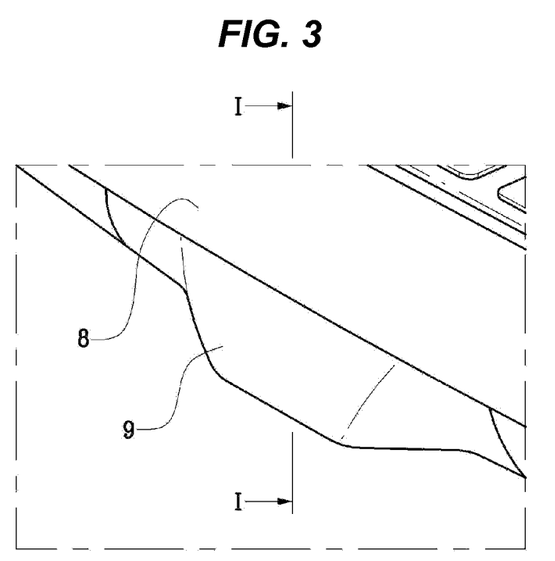
FIG. 3 is a view of a hitch cover that covers a hitch receiver of the related art.
Figure 4:
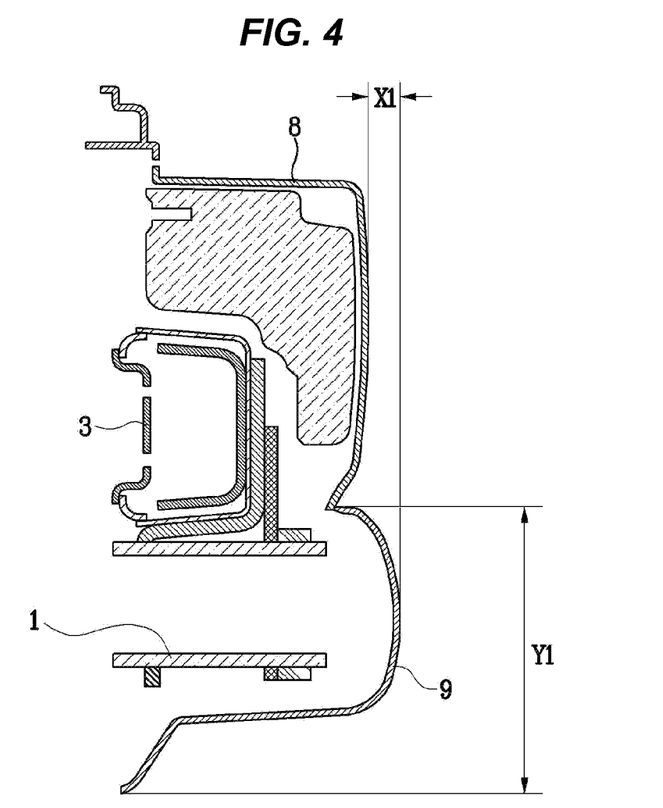
FIG. 4 is a cross-sectional view taken along the line I-I of FIG. 3.

However, the hitch receiver apparatus having the configuration described above of the related art separately needs a hitch cover 9 covering the hitch receiver 1 other than a rear bumper 8 covering the rear back beam 3 because the hitch receiver 1 keeps protruding down under the rear back beam 3, as shown in FIGS. 3 and 4, even if the hitch receiver 1 does not function as a trailer, such that the weight increases and the cost increases.

Further, the height from the ground of a vehicle is decreased by the hitch cover 9, the hitch cover 9 is easily broken or damaged by frequent contact with the ground while the vehicle travels.

Further, the since the rear back beam 3 is coupled to the hitch receiver 1, the amount of rearward protrusion of the hitch cover 9 covering the hitch receiver 1 increases, such that the degree of freedom in design of a vehicle decreases.

Further, when the reinforcing members 5 connected with the side member 4 are used to reinforce the strength of the hitch receiver 1, the weight and the cost increase.

The reference numeral X1 in FIG. 4, which is not described, indicates the amount of forward protrusion of the hitch cover with respect to the rear bumper and the reference numeral Y1 indicates the amount of rearward protrusion of the hitch cover with respect to the rear bumper.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hitch receiver apparatus for a vehicle that is disposed such that a hitch receiver is not connected with a rear back beam, particularly, makes it possible to reduce the weight and cost by not using a separate hitch cover by making it possible to keep the hitch receiver in a rear back beam to perform the function of a rear back beam when the hitch receiver is not used, and makes it possible improve the degree of freedom in design of a vehicle.

Various aspects of the present invention provide for a hitch receiver apparatus for a vehicle including a hitch guide connected with a car body panel through a rear back beam, and a hitch receiver connected with the hitch guide to move up/down along the hitch guide, protruding down under the rear back beam when using the function of a trailer, and positioned in the rear back beam when not using the function of a trailer.

The apparatus may further include a car body mounting bracket combined with the car body panel and protruding above the rear back beam, and a guide mounting bracket connecting the car body mounting bracket with the hitch guide.

The apparatus may include a hitch locking mechanism that is disposed at the hitch receiver and the car body mounting bracket and restricts movement of the hitch receiver such that the hitch receiver cannot be moved by the weight when the hitch receiver is positioned in the rear back beam.

A back beam hole, through which the hitch guide and the hitch receiver pass, and the apparatus may further include a back beam reinforcing bracket integrally formed at the edge of the back beam hole to prevent reduction of rigidity of the rear back beam due to the back beam hole.

The hitch guide may include a fixed rail combined with the guide mounting bracket and disposed through the back beam hole and a movable rail combined with the fixed rail to be able to move along the fixed rail and fixed to the hitch receiver.

A rail cover may be integrally disposed at the lower end of the fixed rail to prevent the movable rail from separating from the fixed rail.

The hitch locking mechanism may include a locking protrusion that is disposed at the hitch receiver to protrude toward the car body mounting bracket through a guide hole formed through the hitch receiver, a locking spring that has one end supported by the locking protrusion and the other end supported by the inner side of the guide hole and supplies an elastic force to the locking protrusion such that the locking protrusion protrudes from the guide hole, an unlocking wire that has one end coupled to the locking protrusion and the other end exposed to the outside of the hitch receiver, and pulls the locking protrusion to move inside the guide hole, and a locking hole formed through the car body mounting bracket to keep the hitch receiver locked, by inserting the locking protrusion.

The position of the locking hole formed through the car body mounting bracket may be determined such that the lower end of the hitch receiver does not protrude down under the rear back beam, when the locking protrusion is inserted in the locking hole.

The hitch guide may be disposed through the rear back beam without being connected with the rear back beam.

According to various aspects of the present invention, since it is possible to keep the hitch receiver in the rear back beam when not using the hitch receiver and to make the hitch receiver protrude down under the rear back beam when using as a trailer, it is not necessary to use a hitch cover, decrease the number of parts and reduce the weight and the cost, and increase the degree of freedom in design of a vehicle, such that it is also possible to improve the external esthetic appearance of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A hitch receiver apparatus for a vehicle of the present invention includes, a shown in FIGS. 5 to 8, a hitch guide 20 connected with a car body frame 12 through a rear back beam 11 without being connected with the rear back beam 11 and a hitch receiver 30 connected with the hitch guide 20 to be able to move up/down along the hitch guide 20, protruding down under the rear back beam 11 when the function of a trailer is used, and positioned in the rear back beam 11 when the function of a trailer is not used.

That is, a predetermined back beam hole 11a having a predetermined size is vertically formed through the rear back beam 11, and the hitch guide 20 and the hitch receiver 30 are disposed in the back beam hole 11a without being connected with the rear back beam 11.

Figure 6:
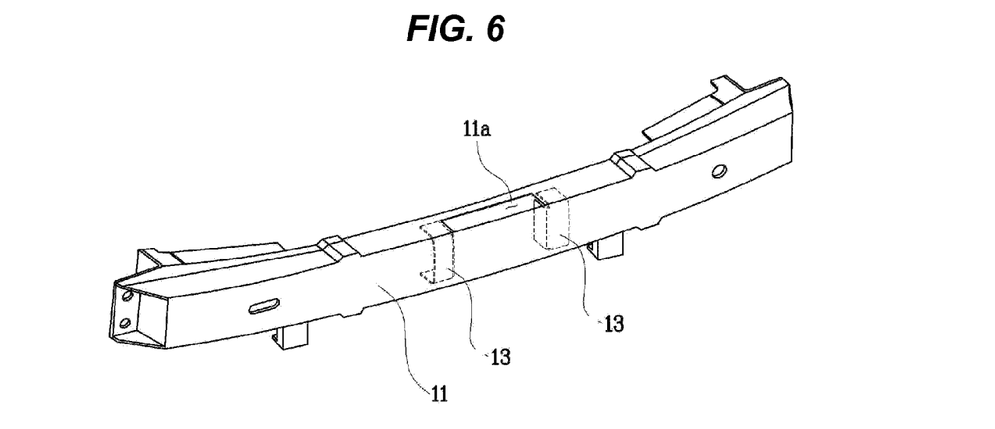
FIG. 6 is a perspective view of an exemplary rear back beam with a back beam hole according to the present invention.

The back beam hole 11a is formed at the center portion of the rear back beam 11 and the rigidity of the rear back beam 11 may be reduced by forming the back beam hole 11a, such that according to the present invention, a back beam reinforcing bracket 13 is integrally coupled to and/or monolithically formed with the edge of the back beam hole 11a to prevent the rigidity of the rear back beam 11 from being reduced by the back beam hole 11a.

Figure 5:
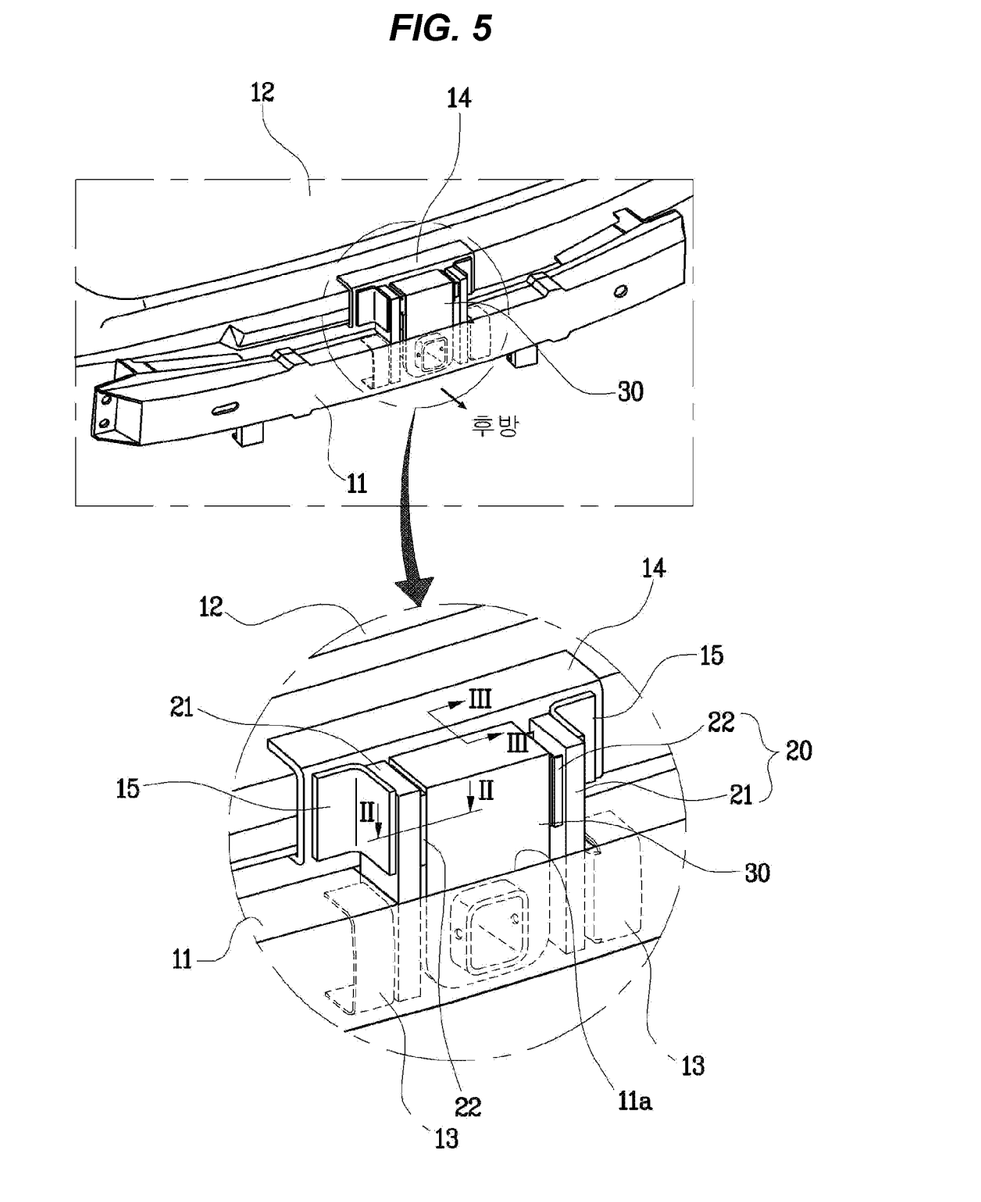
FIG. 5 is a view illustrating an exemplary hitch receiver apparatus according to the present invention.
Figure 7:
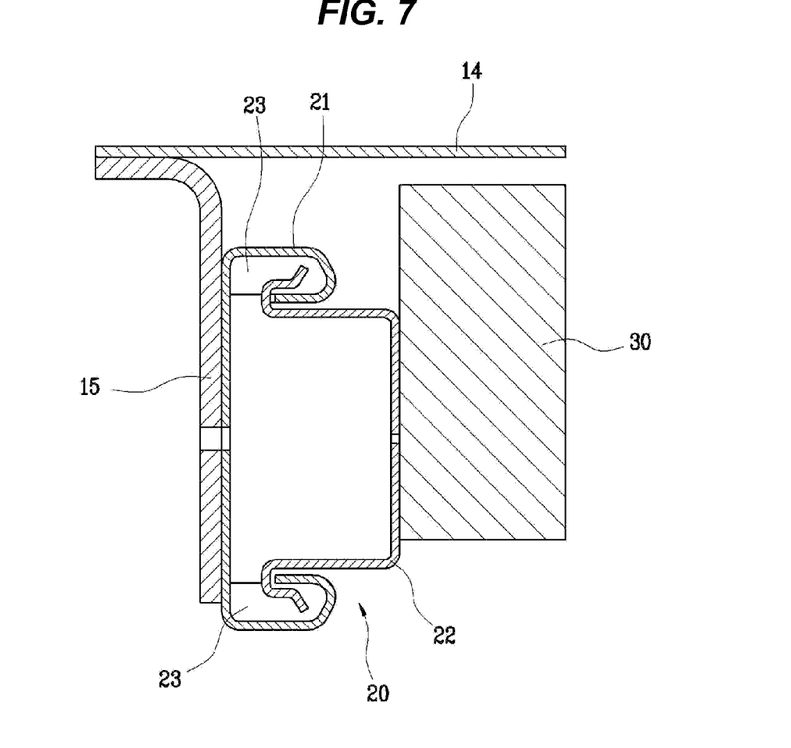
FIGS. 7 and 8 are cross-sectional views taken along the lines II-II and III-III of FIG. 5, respectively.
Figure 8:
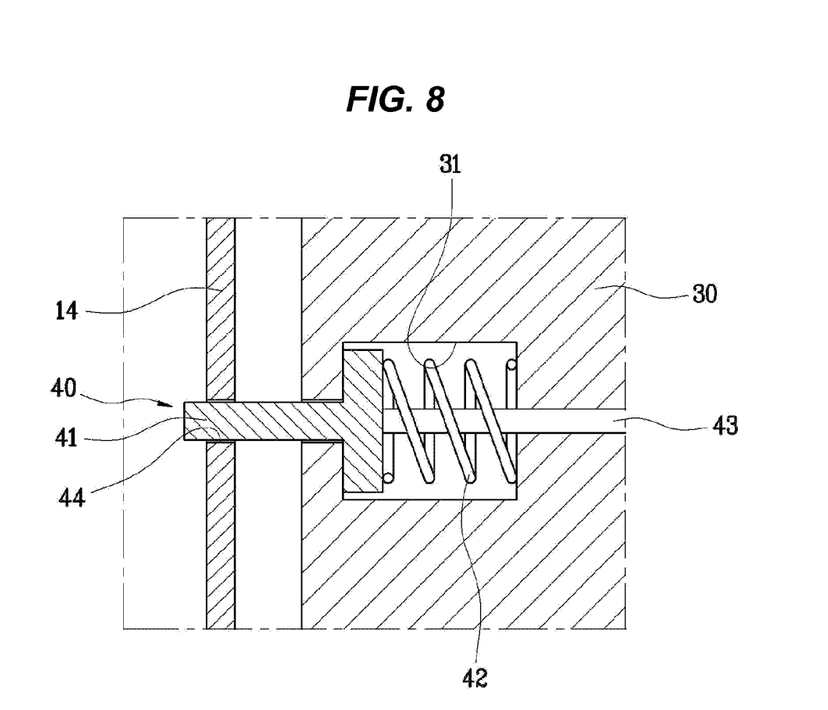

Further, the apparatus according to the present invention further includes a car body mounting bracket 14 combined with the car body panel 12 and protruding above the rear back beam 11, a guide mounting bracket 15 connecting the car body mounting bracket 14 with the hitch guide 20, and a hitch locking mechanism 40 disposed at the hitch receiver 30 and the car body mounting bracket 12 and restricting movement of the hitch receiver 30 such that the hitch receiver 30 cannot be moved by the weight when the hitch receiver 30 is positioned in the rear back beam 11.

The hitch guide 20 includes a fixed rail 21 combined with the guide mounting bracket 15 and disposed through the back beam hole 11a and a movable rail 22 combined with the fixed rail 21 to be able to move along the fixed rail 21 and fixed to the hitch receiver 30.

When a bearing is disposed between the fixed rail 21 and the movable rail 22, it is possible to remove friction between the movable rail 22 and the fixed rail 21 when the movable rail 22 moves along the fixed rail 21.

Further, a rail cover 23 may integrally disposed at and/or monolithically formed with the lower end of the fixed rail 21 to prevent the movable rail 22 from separating from the fixed rail 21.

That is, when the hitch receiver 30 moves to protrude down under the rear back beam 11, the movable rail 22 combined with the hitch receiver 30 is locked by the rail cover 23 disposed at the lower end of the fixed rail 21, such that the movable rail 22 is prevented from separating from the fixed rail 21 and the downward position of the hitch receiver 30 is determined by the rail cover 23.

Further, the hitch locking mechanism 40 includes a locking protrusion 41 that is disposed at the hitch receiver 30 to protrude toward the car body mounting bracket 14 through a guide hole 31 formed through the hitch receiver 30, a locking spring 42 that has one end supported by the locking protrusion 41 and the other end supported by the inner side of the guide hole 31 and supplies an elastic force to the locking protrusion 41 such that the locking protrusion 41 protrudes from the guide hole 31, an unlocking wire 43 that has one end coupled to the locking protrusion 41 and the other end exposed to the outside of the hitch receiver 30, and pulls the locking protrusion 41 to move inside the guide hole 31, and a locking hole 44 formed through the car body mounting bracket 14 to keep the hitch receiver 30 locked, by inserting the locking protrusion 41.

The locking protrusion 41, locking spring 42, and unlocking wire 43 may be disposed in the car body mounting bracket 14, in which the locking hole 44 is formed through the hitch receiver 30.

Meanwhile, the position of the locking hole 44 may be formed through the car body mounting bracket 14 is determined such that the lower end of the hitch receiver 30 does not protrude down under the rear back beam 11, when the locking protrusion 41 is inserted in the locking hole 44.

If the lower end of the hitch receiver 30 protrudes down under the rear back beam 11, when the locking protrusion 41 is inserted in the locking hole 44, there is a defect that it is necessary to use a hitch cover, similar to the related art, in order to cover the lower end of the hitch receiver 30 which protrudes down under the rear back beam 11, such that the present invention provides a configuration that does not use a hitch cover by determining the position where the locking hole 44 is formed.

The operation of the hitch receiver apparatus for a vehicle according to various embodiments of the present invention is described hereafter.

FIG. 5 shows when the hitch receiver 30 does not function as a trailer, in which the hitch receiver 30, as shown in FIG. 8, keeps fixed by the supporting force of the locking protrusion 41 inserted in the locking hole 44, and accordingly, the lower end of the hitch receiver 30 is inserted in the back beam hole 11a without protruding down under the rear back beam 11.

When the hitch receiver 30 is inserted in the back beam hole 11a, as described above, the hitch receiver 30 functions as a back beam to protect the car body together with the rear back beam 11.

Further, since the rear end of the hitch receiver 30 does not protrude down under the rear back beam 11 when the hitch receiver 30 is inserted in the back beam hole 11a, it is not necessary to use a hitch cover, unlike the related art, such that that present invention has the advantage that it is possible to decrease the number of parts and reduce the weight and the cost.

Further, when a hitch cover is not used, the height from the ground of a vehicle increases, such that it is possible to improve safety of the car body.

Further, a worker pulls the unlocking wire 43 outside the hitch receiver to use the hitch receiver 30 as a trailer.

Figure 9:
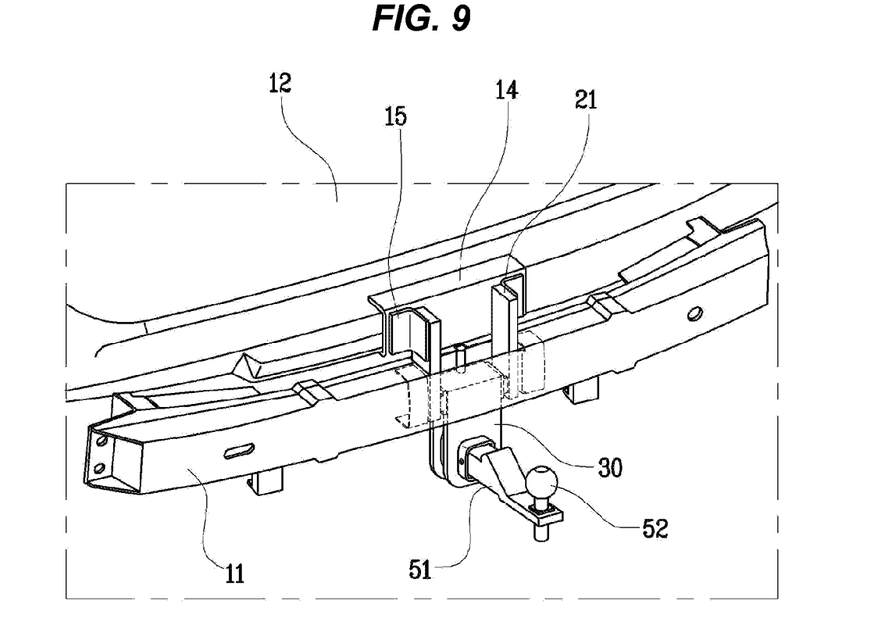
FIG. 9 is a view illustrating the operation of an exemplary hitch receiver apparatus according to the present invention.

Therefore, as shown in FIG. 8, the locking protrusion 41 inserted in the locking hole 44 is moved into the guide hole 31 and comes out from the locking hole 44 by the pulling of the unlocking wire 43, the movable rail 22 combined with the hitch receiver 30 is moved down along the fixed rail by the weight, and the movable rail 22 stops moving down by being locked to the rail cover 23 at the lower end of the fixed rail 21, such that the hitch receiver 30 positioned in the back beam hole 11a, as shown in FIG. 5, protrudes down under the rear back beam 11, as shown in FIG. 9.

As the hitch receiver 30 protrudes down under the rear back beam 11, as shown in FIG. 9, the worker uses the hitch receiver 30 as a trailer by fastening the drawbar 51 and the ball joint 52 to the hitch receiver 30.

As described above, since the hitch receiver apparatus according to the present invention has a configuration in which the hitch receiver 30 is directly combined with the rear back beam 11, such that the hitch receiver can be kept in the back beam hole 11a when it is not used as a trailer, therefore, it is possible not to use a hitch cover and it is correspondingly possible to decrease the number of parts and reduce the weight and the cost.

Further, as a hitch cover is not used, the height from the ground of a vehicle increases, such that it is possible to improve safety of the car body.

Further, since the hitch receiver 30 is not directly combined with the rear back beam 11, it is possible to prevent the hitch receiver 30 from protruding rearward from a vehicle, such that it is possible to improve the external esthetic appearance of the vehicle and it is also possible to increase the degree of freedom in design of a vehicle.

Further, since the present invention does not use a reinforcing member, unlike the related art, it is possible to decrease the number of parts and reduce the weight and the cost.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hitch receiver apparatus for a vehicle comprising:
   a hitch guide mounted on a car body panel through a rear back beam;
   a hitch receiver movably mounted on the hitch guide to move up/down relative to the hitch guide, protruding down under the rear back beam when in a trailer-pulling position, and positioned within in the rear back beam when in a stow position;
   a car body mounting bracket combined with the car body panel and protruding above the rear back beam; and
   a guide mounting bracket connecting the car body mounting bracket with the hitch guide.

2. The apparatus of claim 1, further comprising a hitch locking mechanism that is disposed at the hitch receiver and the car body mounting bracket and restricts movement of the hitch receiver such that the hitch receiver cannot be moved by the weight when the hitch receiver is positioned in the rear back beam.

3. The apparatus of claim 1, wherein the hitch guide and the hitch receiver pass through a back beam hole, and
   the apparatus further comprises a back beam reinforcing bracket integrally formed at the edge of the back beam hole to prevent reduction of rigidity of the rear back beam due to the back beam hole.

4. The apparatus of claim 3, wherein the hitch guide includes a fixed rail combined with the guide mounting bracket and disposed through the back beam hole and a movable rail combined with the fixed rail to be able to move along the fixed rail and fixed to the hitch receiver.

5. The apparatus of claim 4, wherein a rail cover is integrally disposed at the lower end of the fixed rail to prevent the movable rail from separating from the fixed rail.

6. The apparatus of claim 2, wherein the hitch locking mechanism includes:
   a locking protrusion that is disposed at the hitch receiver to protrude toward the car body mounting bracket through a guide hole formed through the hitch receiver;
   a locking spring that has one end supported by the locking protrusion and the other end supported by the inner side of the guide hole and supplies an elastic force to the locking protrusion such that the locking protrusion protrudes from the guide hole;

an unlocking wire that has one end coupled to the locking protrusion and the other end exposed to the outside of the hitch receiver, and pulls the locking protrusion to move inside the guide hole; and a locking hole formed through the car body mounting bracket to keep the hitch receiver locked, by inserting the locking protrusion.

7. The apparatus of claim 6, wherein the position of the locking hole formed through the car body mounting bracket is determined such that the lower end of the hitch receiver does not protrude down under the rear back beam, when the locking protrusion is inserted in the locking hole.

8. The apparatus of claim 1, wherein the hitch guide is disposed through the rear back beam without being connected with the rear back beam.

* * * * *